US012804773B2

(12) United States Patent
Bunnett

(10) Patent No.: US 12,804,773 B2
(45) Date of Patent: Nov. 17, 2026

(54) PRECISION ROUTING FOR EMERGENCY CALL

(71) Applicant: Intrado Life & Safety, Inc., Longmont, CO (US)

(72) Inventor: Chantal Bunnett, Quebec (CA)

(73) Assignee: Intrado Life & Safety, Inc., Longmont, CO (US)

( * ) Notice: Subject to any disclaimer, the term of this patent is extended or adjusted under 35 U.S.C. 154(b) by 186 days.

(21) Appl. No.: 18/627,321

(22) Filed: Apr. 4, 2024

(65) Prior Publication Data

US 2025/0317513 A1 Oct. 9, 2025

Related U.S. Application Data

(63) Continuation of application No. 18/627,076, filed on Apr. 4, 2024.

(51) Int. Cl.

| | |
|---|---|
| ***H04W 76/50*** | (2018.01) |
| ***H04M 3/22*** | (2006.01) |
| ***H04M 3/436*** | (2006.01) |
| ***H04M 3/51*** | (2006.01) |
| ***H04W 40/28*** | (2009.01) |

(52) U.S. Cl.

CPC ......... *H04W 76/50* (2018.02); *H04M 3/2281* (2013.01); *H04M 3/436* (2013.01); *H04M 3/5116* (2013.01); *H04W 40/28* (2013.01); *H04M 2242/04* (2013.01)

(58) Field of Classification Search

None

See application file for complete search history.

(56) References Cited

U.S. PATENT DOCUMENTS

| | | | |
|---|---|---|---|
| 5,867,562 | A | 2/1999 | Scherer |
| 6,038,440 | A | 3/2000 | Wu |
| 6,148,070 | A | 11/2000 | Meek et al. |
| 6,459,788 | B1 | 10/2002 | Khuc et al. |
| 6,463,127 | B1 | 10/2002 | Maier et al. |
| 6,473,505 | B1 | 10/2002 | Khuc et al. |
| 7,302,250 | B2 | 11/2007 | Chin et al. |
| 7,437,143 | B1 | 10/2008 | Williams |
| 8,238,532 | B1 | 8/2012 | Cox et al. |
| 9,014,352 | B1 | 4/2015 | Davis |
| 9,317,855 | B2 | 4/2016 | Altberg et al. |
| 9,510,171 | B1 | 11/2016 | Sill et al. |
| 10,091,349 | B1 | 10/2018 | Rao et al. |
| 12,238,243 | B2 | 2/2025 | Jakobsson |
| 2004/0141607 | A1 | 7/2004 | Rollender |
| 2004/0185823 | A1 | 9/2004 | Chin et al. |
| 2005/0076246 | A1 | 4/2005 | Singhal |

(Continued)

FOREIGN PATENT DOCUMENTS

DE 69829118 T2 12/2005

OTHER PUBLICATIONS

USPTO, Non-Final Office Action in U.S. Appl. No. 18/627,076 dated Mar. 13, 2026, 16 pages.

(Continued)

*Primary Examiner* — Hemant S Patel

(74) *Attorney, Agent, or Firm* — Patent Capital Group

(57) ABSTRACT

A method implemented by a system includes receiving a call; determining whether the call is legitimate; and routing the call to a public safety answering point (PSAP).

20 Claims, 5 Drawing Sheets

(56) References Cited

U.S. PATENT DOCUMENTS

| | | | | |
|---|---|---|---|---|
| 2005/0282518 | A1 | 12/2005 | D'Evelyn et al. | |
| 2006/0182234 | A1 | 8/2006 | Scherer | |
| 2006/0193446 | A1* | 8/2006 | Colunga | H04M 3/5116 379/49 |
| 2007/0280428 | A1 | 12/2007 | Mcclelland | |
| 2010/0087160 | A1* | 4/2010 | Snapp | H04W 76/50 455/404.1 |
| 2011/0194553 | A1 | 8/2011 | Sahin et al. | |
| 2011/0263234 | A1 | 10/2011 | Ruan et al. | |
| 2013/0083902 | A1* | 4/2013 | Goswami | H04M 3/5116 379/37 |
| 2014/0192964 | A1* | 7/2014 | Bhogal | H04M 3/5116 379/45 |
| 2014/0286484 | A1* | 9/2014 | Ehrlich | H04M 3/436 379/142.06 |
| 2018/0301017 | A1* | 10/2018 | Dizengof | G08B 25/016 |
| 2020/0396331 | A1 | 12/2020 | Gupta et al. | |
| 2021/0058507 | A1* | 2/2021 | Cornwell | H04M 3/5175 |
| 2023/0066525 | A1* | 3/2023 | Cabanas | H04W 4/029 |
| 2025/0047788 | A1* | 2/2025 | Blustein | H04M 3/42059 |
| 2025/0291899 | A1 | 9/2025 | Kassis et al. | |
| 2025/0318013 | A1* | 10/2025 | Bunnett | H04W 40/28 |

OTHER PUBLICATIONS

USPTO, Non-Final Office Action in U.S. Appl. No. 18/627,076 dated Jun. 18, 2026, 12 pages.

USPTO, Non-Final Office Action in U.S. Appl. No. 18/627,076 dated Aug. 12, 2026, 16 pages.

* cited by examiner

PRECISION ROUTING FOR EMERGENCY CALL

RELATED APPLICATION

This application is a continuation (and claims the benefit of priority under 35 U.S.C. § 120) of U.S. application Ser. No. 18/627,076, filed on Apr. 4, 2024, entitled "PRECISION ROUTING FOR EMERGENCY CALL," Inventor Chantal Bunnett. The disclosure of that application is considered part of and is incorporated in its entirety by reference in the disclosure of this application.

BACKGROUND

Technical Field

This disclosure relates to a centralized exchange for telephonic communication and, in particular, to such an exchange for an emergency call by a Non-Service Initiated telephone.

Related Art

North American public safety answering points (PSAPs) receive emergency 911 calls, yet they are facing an overwhelming shortage of call takers. Further, call counts to these PSAPs are rising. Thus, because there is an insufficient number of call takers, wait times have been increasing.

Often, 911 PSAPs have a recorded announcement on their 911 queues because of these increased wait times. The delay caused by this recorded announcement means some urgent calls are not getting sufficient treatment by a call taker at the PSAP.

BRIEF SUMMARY

In a first implementation of the present disclosure, a method is implemented by a system, the method comprising: receiving a call; determining whether the call is legitimate; and routing the call to a public safety answering point (PSAP).

In another implementation, a system includes at least one network interface; and at least one processor configured, with the at least one network interface, to cause the system to at least receive a call; perform a determination whether the call is legitimate; and perform a routing of the call to a public safety answering point (PSAP).

In a further implementation, a computer-readable medium is encoded with a computer program that, when executed by a system including at least one processor, causes the system to perform operations comprising: receiving a call; determining whether the call is legitimate; and routing the call to a public safety answering point (PSAP).

DETAILED DESCRIPTION

The following foundational information forms a basis from which aspects of the present disclosure can be explained. Such information is offered for purposes of explanation only and, accordingly, should not be construed to limit the scope of the present disclosure, its potential applications, nor the claims.

Recently, 911 PSAPs have received many calls from telephones number that have been assigned an automatic number identification (ANI) such as 000-911-0000 or 911-000-0000. Because service providers assign these ANIs only in limited circumstances, these ANIs have no information in automatic location identification (ALI) databases of the PSAPs. Rather, the calls are considered Non-service Initialized (NSI) calls. Some PSAPs receive hundreds of such calls per year; some PSAPs annually receive thousands of such calls.

Below are statistics from some large PSAP sites for the month of November 2023.

| State | Agency Name | Total 911 | Total NSI | Percentage of NSI |
|---|---|---|---|---|
| CA | Los Angeles PD | 232997 | 19240 | 8.26% |
| DC | Office of Unified Communications | 81295 | 5407 | 6.65% |
| TN | Memphis PD | 54816 | 5118 | 9.34% |
| TX | Austin PD | 64607 | 4311 | 6.67% |

Because PSAPs answer emergency calls in the order they are received, these calls often take precious time away from real emergencies.

A high percentage of these calls are considered nuisance calls and arise from, for example, children playing with deactivated mobile telephones. Although the mobile telephone might lack cellular service, it is still able to place emergency calls. However, because the mobile telephone is deactivated, it lacks a telephone number, which is supplied as part of wireless service.

Thus, in the context of the present disclosure, an "emergency call" is to be understood as a call placed to an emergency service, such as 911. That is, whether the call is ultimately used to report an emergency can be irrelevant, because a child is more likely to be playing with a deactivated mobile telephone than using the telephone to report an emergency.

Similarly, the intention of a caller in dialing the emergency number can be irrelevant. Again, because a child is unlikely to have intended to place a call to 911, the intent to call can be irrelevant.

Thus, in select implementations of the present disclosure, PSAPs can opt-in to a precision routing service in which a first agent routes these calls to a second agent, such as a centralized 911 PSAP. The second agent can determine whether a caller is reporting a real emergency, the type of the emergency, and the location of the emergency, and then transfer the call to a determined PSAP.

To potentially address this issue and others, various implementations of the present disclosure can use precision routing, as shown herein.

Figure 1:
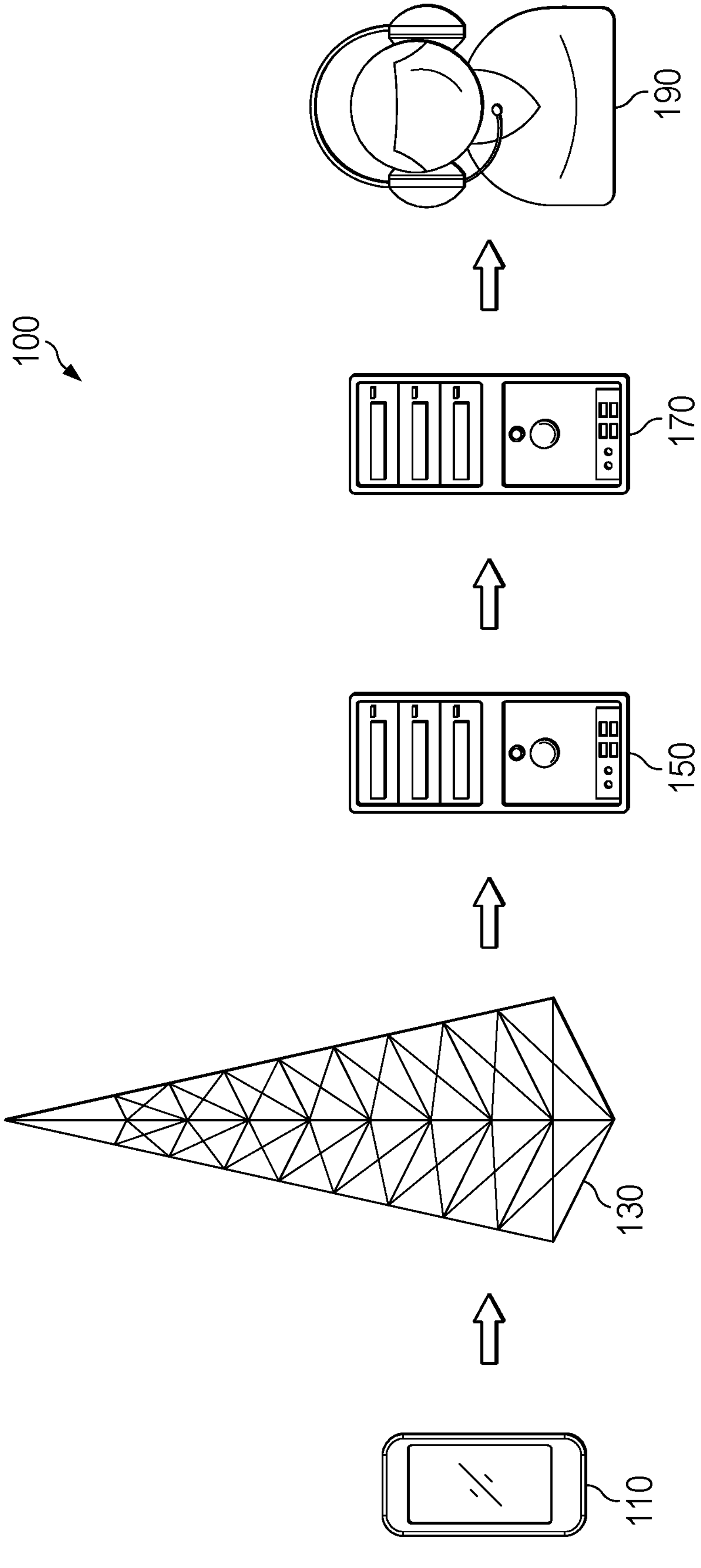
FIG. 1 illustrates a system for precision routing of an emergency call, according to an implementation of the present disclosure.

FIG. 1 illustrates a system 100 for precision routing of an emergency call, according to an implementation of the present disclosure. The system 100 includes a mobile telephone 110, a cellular tower 130, a first agent 150, a second agent 170, and a PSAP 190.

The mobile telephone 110 transmits an emergency call. In many circumstances, the mobile telephone 110 can be a deactivated mobile telephone. However, the mobile telephone 110 is not limited to being deactivated.

The cellular tower 130 can include an antenna that receives the emergency call from the mobile telephone 110. The cellular tower 130 can include or communicate with a memory that stores identifiers for one or more PSAPs that service an area from which the cellular tower 130 can receive calls. In some implementations, the cellular tower 130 can include or communicate with a processor that determines to which of the one or more PSAPs to forward the emergency call, based on the side of the cellular tower 130 that receives the signal of the call.

As discussed above, PSAPs can opt-in to precision routing according to at least one implementation of the present disclosure. Thus, the processor for the cellular tower 130 can determine whether the one of the PSAPs has opted-in to the precision routing service. If the one of the PSAPs has not opted-in to the service, then the cellular tower 130 can forward the call to that PSAP. If that PSAP has opted-in to the service, then the cellular tower can continue the call processing.

Next in the call processing, the cellular tower 130 can add information to the call. For example, the cellular tower 130 can add an identifier of a location of the cellular tower 130 to the ALI of the call. The location can be an address, geographic coordinates, or a geocode (e.g., what3words).

In addition or alternatively, the cellular tower 130 can add an identifier of the PSAP to which the cellular tower 130 would have routed the call.

Subsequently, the call processing of the cellular tower 130 then routes the call to the first agent 150.

The first agent 150 can be or include a computer system or other combination of one or more information processing devices in various implementations. The first agent 150 can receive the call from the cellular tower 130. The first agent 150 can perform operations discussed later in connection with FIG. 2. Thus, the first agent 150 can route the call to the second agent 170.

The second agent 170 can be or include a computer system or other combination of one or more information processing devices in various implementations. The second agent 170 can receive the call from the first agent 150. The second agent 170 can perform the operations discussed later in connection with FIG. 3. Thus, the second agent 170 can determine an identity of a PSAP to which to route the call. The second agent 170 can then route the call to the PSAP 190.

The PSAP 190 can be or include a facility that includes at least one call taker and a computer system or other combination of one or more information processing devices. The PSAP 190 can receive the call from the second agent 170. In many implementations, the call taker can answer the call and dispatch emergency personnel to the location of the emergency.

The system 100 can be consolidated in many implementations. Notably, the first agent 150 and the second agent 170 can be combined, such that one computer system performs the operations of both FIGS. 2 and 3. Similarly, the cellular tower 130 can incorporate aspects of the first agent 150, and the second agent 170 can be combined (e.g., co-located) with the PSAP 190. Other combinations are possible, as well.

Figure 2:
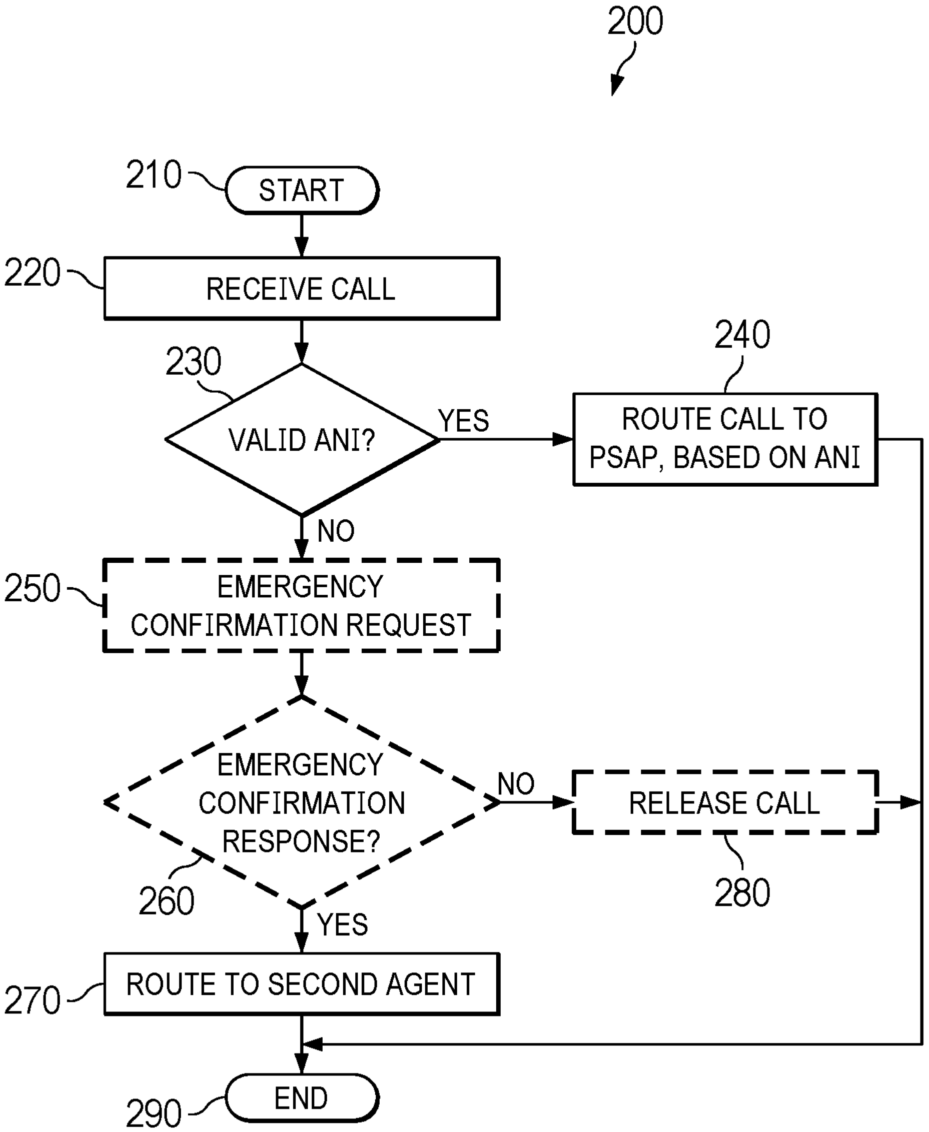
FIG. 2 illustrates an algorithm performed by a first agent, according to an implementation of the present disclosure.

FIG. 2 illustrates an algorithm 200 performed by a first agent, according to an implementation of the present disclosure. For example, the algorithm 200 can be performed by the first agent 150.

The algorithm 200 begins at 210 and advances to 220.

In 220, the first agent receives a call, such as from the cellular tower 130, as discussed in connection with FIG. 1. In many implementations, this call is an emergency call originally placed by the mobile telephone 110. The algorithm 200 then advances to 230.

In 230, the first agent determines whether the ANI of the call is valid. For example, the first agent can determine whether the ANI of the call is one of a plurality of predetermined numbers, such as 000-911-0000 or 911-000-0000. If the ANI of the call is not one of the predetermined numbers, then the ANI of the call is valid. If the ANI of the call is one of the predetermined numbers, then the ANI of the call is not valid.

If the first agent determines the ANI is valid, then the algorithm 200 advances to 240. If the first agent determines the ANI is not valid, then the algorithm 200 advances to 250.

In 240, the first agent routes the call to a PSAP assigned to the ANI. The algorithm 200 then advances to 290.

If the first agent determines the ANI was not valid in 230, then in 250, the first agent optionally makes an emergency confirmation request. For example, the first agent can audibly prompt the caller to confirm there is an emergency. The prompt can be a recording of a human voice or a synthesized voice. The algorithm 200 then advances to 260.

In 260, the first agent optionally determines whether an emergency confirmation response is received over the call. The emergency confirmation response is, for example, an audio input from the caller. The audio input can be a dual-tone multi-frequency signaling (DTMF) (e.g., "touch-tone") input.

The audio input also can be a vocal input from the caller. In various implementations, the first agent can accept a vocal confirmation in many languages, such as "yes," "oui," or "si."

Indeed, in many implementations, the content of the audio input is irrelevant. Rather, the emergency confirmation screening can be performed to raise the awareness of the caller (e.g., a child) that an emergency number has been dialed. Further, the emergency confirmation screening can be performed to filter out calls that are incapable of responding to an audio prompt.

If the first agent determines an emergency confirmation response was not received, then the algorithm advances to 280. If the first agent determines an emergency confirmation response was received, then the algorithm 200 advances to 270.

In 280, the first agent can release the call. The algorithm 200 then advances to 290.

If the first agent determines the emergency confirmation response was not received in 260, then in 270, the first agent can route the call to the second agent. In an example in which the first agent routes the call to only one second agent (e.g., because one second agent is sufficient for handling all such calls from a nation of the first agent), then the first agent routes the call to such a second agent.

In other implementations, the first agent can determine a second agent of a plurality of second agents to which to route the call. Because the call might pertain to an emergency, it can be desirable to reduce the delay caused by this routing. Thus, the first agent can determine the second agent, at least in part based on the location of a cellular tower (e.g., cellular tower 130) that received the call. For example, as discussed previously, the cellular tower can add an identifier of a location of the cellular tower or an identifier of a PSAP to the call. The first agent can then determine the second agent, at least in part based on the location of the cellular tower or the PSAP.

Then, the first agent can determine the second agent that is closest to or serves the address of the cellular tower. The first agent also can determine the second agent that is closest to or serves the PSAP to which the cellular tower routes calls. The first agent can then route the call to that second agent.

In select implementations, the determination of the second agent by the first agent can be based on one or more criteria other than the location of the cellular tower. For example, the first agent can receive network data that indicates a latency associated with one or more second agents. The first agent can then determine the second agent with a reduced latency and route the call to that second agent.

In several implementations, this latency is measured from the first agent to the plurality of second agents. For example, the first agent can periodically transmit a signal to (e.g., "ping") each of the second agents. The first agent can time the duration until the first agent receives a respective response from each respective second agent. Thus, the first agent can determine a latency between the first agent and each respective second agent. Accordingly, the first agent can route the call to the second agent with a reduced latency.

However, the latency between the first agent and a second agent does not necessarily reflect the latency between the cellular telephone 110 and that second agent. Therefore, if the network data indicates a latency between the cellular telephone 110 and a second agent, then the first agent can determine the second agent based on that latency.

Similarly, the network data can include information indicating issues associated with a particular second agent, such as packet loss and/or network outage in a network associated with the particular second agent. In this case, the first agent can route the call to a different second agent, based on the packet loss and/or the network outage.

When the first agent routes the call to the second agent in 270, the first agent can transmit call detail information regarding the call to the second agent. For example, the call detail information can indicate or include the location of the cellular tower that received the call. The call detail information can indicate or include an identifier of the first agent itself. The call detail information can indicate a link to or include a recording of at least a portion of the call and/or at least a portion of the emergency confirmation response, particularly when the emergency confirmation response is a vocal input.

The algorithm 200 then advances to 290.

In 290, the algorithm 200 concludes.

Figure 3:
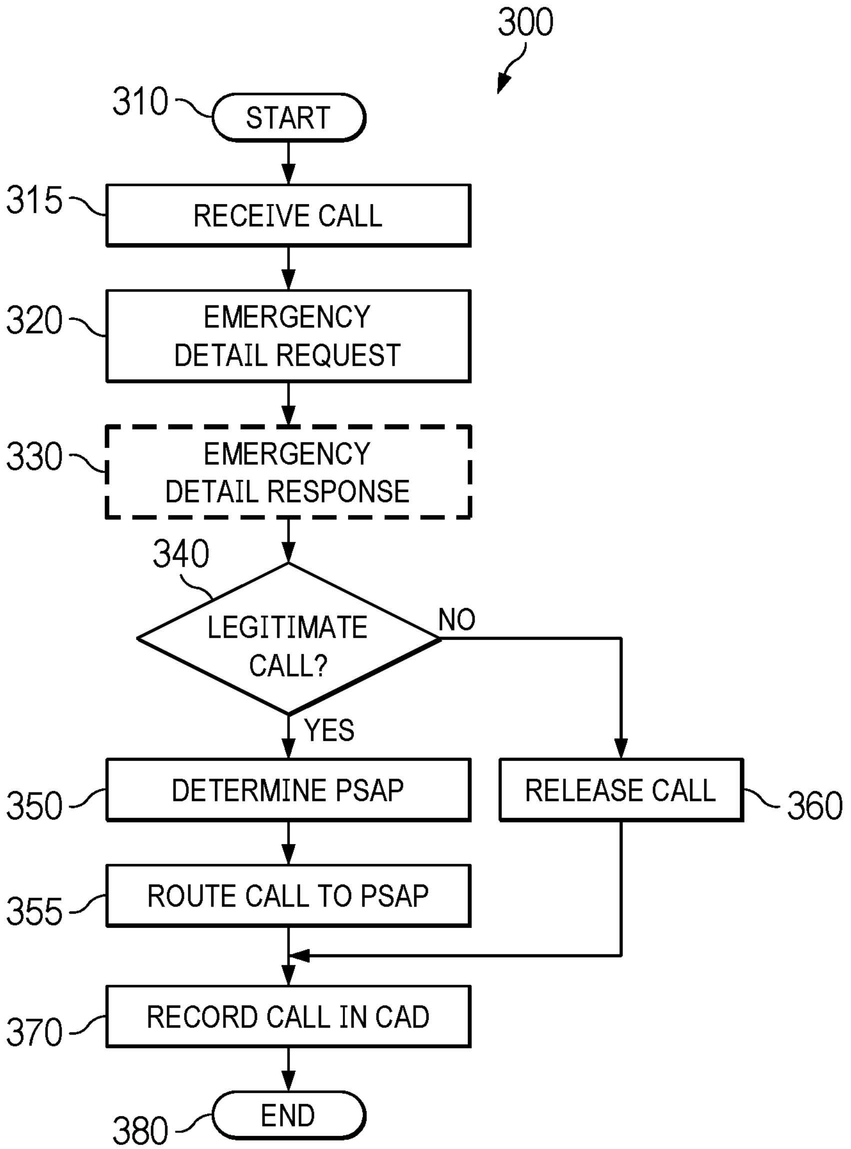
FIG. 3 illustrates an algorithm performed by a second agent, according to an implementation of the present disclosure.

FIG. 3 illustrates an algorithm 300 performed by a second agent, according to an implementation of the present disclosure.

The algorithm 300 begins at 310 and advances to 315.

In 315, the call is received by the second agent. In some implementations, the second agent also receives the call detail information. The second agent can receive the call and the call detail information from the first agent.

Further, in some implementations, in 315, the second agent can record the time at which the call is received.

The algorithm 300 then advances to 320.

In 320, the second agent can transmit an emergency detail request over the call to the caller. For example, the second agent can transmit a recorded voice asking for an identification (e.g., a type) of the emergency. The recorded voice also can ask for a location (e.g., address or nearby intersection) of the emergency. Further, the recorded voice can also ask for a telephone number from which the call is being made.

In some implementations, the second agent prompts a human agent to ask for the identification of the emergency, the location, and/or the telephone number. The algorithm 300 then advances to 330.

In 330, the second agent optionally receives an emergency detail response over the call from the caller. In some implementations, the emergency detail response can be or include a human voice or a DTMF input.

The emergency detail response can indicate the type of the emergency, such as fire, medical, police, or highway patrol, for example. The emergency detail response can indicate the location of the emergency. Further, the emergency detail response can indicate the telephone number from which the caller called. The algorithm 300 then advances to 340.

In 340, the second agent can perform a determination whether the call is legitimate. For example, the second agent can determine whether an emergency detail response is received in 330. In some implementations, the second agent can determine the emergency detail response included a human voice. In particular implementations, the second agent can determine the emergency detail response included a DTMF input. In this case, the second agent can determine the call is legitimate.

Further, in select implementations, the second agent can determine the call is legitimate, based on call detail information indicated by the call. For example, the call detail information can indicate a recording of at least a portion of the call and/or at least a portion of the emergency confirmation response.

In particular implementations, the second agent can determine the emergency detail response does not include a substantive response. For example, the second agent can determine the human voice indicates the call was an accident, because the voice apologizes or says "Whoops" or the like. In various implementations, the second agent can determine the human voice is conducting a prank call, such as by ordering a pizza. In some implementations, the second agent can determine the DTMF input is not responsive to the menuing. For example, the DTMF input might indicate that the "9" key was pushed, but the emergency detail request did not include a menu option for the "9" key. In this case, the second agent can determine the call is not legitimate.

In several implementations, the second agent determines whether the call is legitimate, at least in part based on a machine-learning algorithm. An exemplary training of such an algorithm is discussed later in connection with FIG. 4.

If the second agent determines the call is legitimate, then the algorithm 300 advances to 350. If the second agent determines the call is not legitimate, the algorithm 300 advances to 360.

In 350, the second agent determines a PSAP to which to route the call. In some implementations, the second agent determines the PSAP, at least in part based on the emergency detail response or the call detail information.

For example, the second agent can determine the PSAP, at least in part based on the location of the emergency identified in the emergency detail response. In one implementation, the second agent can determine the PSAP, at least in part based on a reduced distance between the PSAP and the location of the emergency. For example, the second agent can determine a closest PSAP to the location, at least in part based on a database that associates PSAPs to locations. Such a database is maintained by Intrado Life & Safety Inc. of Longmont, CO.

In some implementations, the second agent determines a jurisdiction serving the location of the emergency. For example, although a PSAP might be located near the location of the emergency, the PSAP might not have authorization to dispatch emergency personnel to that location. Thus, the second agent can determine a PSAP serving a jurisdiction of the location of the emergency, at least in part based on a database that associates PSAPs to jurisdictions. Again, such a database is maintained by Intrado Life & Safety Inc. of Longmont, CO.

In some situations, the emergency detail response does not state a specific location. Nevertheless, the emergency detail response can indicate information that can approximate a location, such as the location from which the call was made. For example, the emergency detail response can include a caller stating their area code or entering their area code via a DTMF input. Thus, if the emergency detail response indicates a telephone area code, the second agent can approximate a location of the emergency, based on the telephone area code.

Further, not all PSAPs can dispatch emergency personnel for every type of emergency. Accordingly, in some implementations, if the emergency detail response indicates the type of emergency (e.g., fire, medical, police, or highway patrol), the second agent can determine the PSAP to which to route the call, at least in part based on the type of the emergency. Thus, the PSAP to which the call is routed can dispatch emergency personnel that are more relevant to the emergency.

In particular implementations, the second agent can determine the PSAP based on both the location of the emergency and the type of emergency. Thus, a PSAP that has a reduced distance to the location of the emergency can dispatch relevant emergency personnel thereto. In some implementations, such a dispatch can reduce the time until the emergency personnel arrive at the location of the emergency.

Of course, in various implementations, the second agent can determine the PSAP based on the jurisdiction of the location of the emergency and the type of emergency. Thus, although a different PSAP might be closer to the location of the emergency, the PSAP to which the second agent routes the call can have the authority to dispatch relevant emergency personnel to the location of the emergency.

In some implementations, the second agent determines the PSAP, at least in part based on the call detail information received in 315. For example, the second agent can determine the PSAP, at least in part based on information added to the call by the cellular tower indicating the PSAP to which the cellular tower would have routed the call. The second agent can determine the PSAP, at least in part based on the location of the cellular tower that received the call. The second agent can determine the PSAP based on a distance between the PSAP and the location of the cellular tower. The second agent can determine a jurisdiction including the location of the cellular tower and can then determine the PSAP at least in part based on the jurisdiction.

Further, the second agent can determine the PSAP at least in part based on the type of emergency, as well as the location of the cellular tower. For example, the second agent can determine the PSAP based on the type of emergency and the distance between the location of the PSAP and the location of the cellular tower. The second agent additionally or alternatively can determine the PSAP based on the type of emergency and a jurisdiction that serves the location of the cellular tower.

The algorithm 300 then advances to 355.

In 355, the second agent routes the call to the PSAP.

The algorithm 300 then advances to 370.

Returning to 340, if the second agent determines the call is not legitimate, the algorithm 300 advances to 360. In 360, the second agent releases the call. For example, the second agent hangs up on the call. The algorithm 300 then advances to 370.

In 370, the second agent records data concerning the call in the computer-aided dispatch (CAD) log. For example, the second agent can record in the CAD log the time at which the second agent received the call and the duration for which the second agent handled the call. The second agent can record the disposition of the call (e.g., routed to a PSAP or released) in the CAD log. Because the routing and forwarding are based on the legitimacy of the call, the disposition itself can also be based on the legitimacy of the call. If the second agent forwards the call to a PSAP, the second agent can record an identifier of the PSAP in the CAD log.

The second agent can store a recording and/or a transcript of the call. If the emergency detail response indicates a telephone number, then the second agent can record the telephone number in the CAD log.

In some implementations, the second agent can store in the CAD log the call detail information received in 315. For example, the second agent can store the location of the cellular tower in the CAD log.

The second agent can also store an identifier of the second agent and an identifier of the PSAP to which the second agent routed the call.

The algorithm 300 then advances to 380.

In 380, the algorithm 300 ends.

Once the call is forwarded to the PSAP, the PSAP can continue the call with the caller. Thus, although the second agent itself might lack sufficient information to dispatch emergency personnel to the location of the emergency, the PSAP can receive sufficient information once the call is routed there.

Because an emergency can be urgent, some inaccuracy in determining the PSAP to which the call is routed can be tolerated in the interest of reducing the processing duration.

In particular implementations, the PSAP can be integrated (e.g., co-located) with the second agent.

Figure 4:
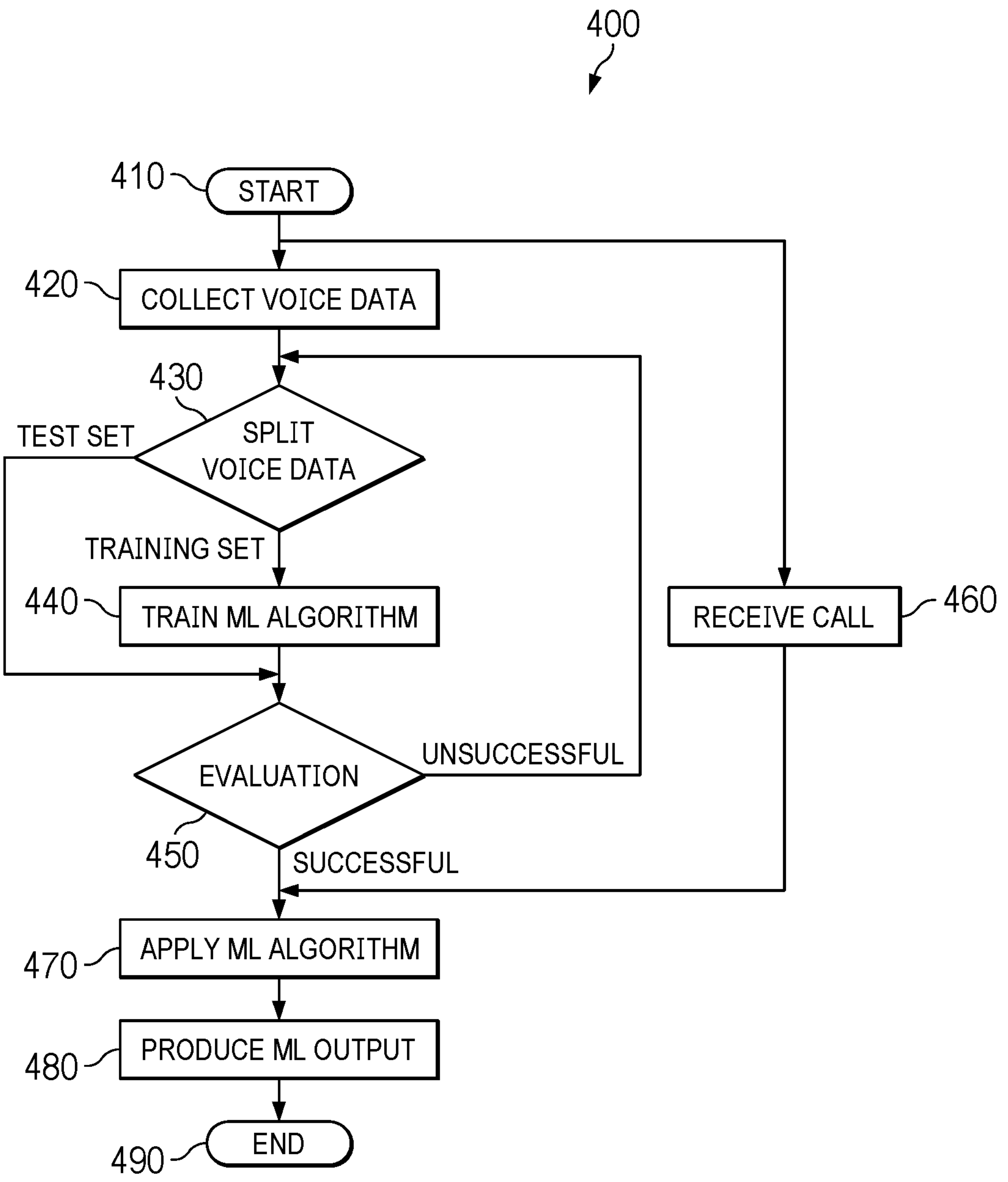
FIG. 4 illustrates an algorithm for training a machine-learning algorithm, according to an implementation of the present disclosure.

FIG. 4 illustrates an algorithm 400 for training a machine-learning algorithm, according to an implementation of the present disclosure. The algorithm 400 can be performed to produce a product by which the second agent can determine whether the call is legitimate in 340.

The algorithm 400 begins at 410 and advances to 420.

In 420, the algorithm 400 collects voice data. The voice data can be received from multiple speakers, whether human, synthesized, or modified from humans. The voice data can be from recorded emergency calls, non-emergency calls, or non-call sources. The speakers can be male, female, or transgender; the speakers can be children, adults, teenagers, or any other age.

The voice data can be in different languages, such as English, Spanish, and French. In some implementations, the voice data can be irrelevant or otherwise non-responsive to questions of whether there is an emergency or what the type of emergency might be (e.g., the voice says "pizza").

The algorithm 400 then advances to 430.

In 430, the algorithm 400 splits the voice data into a test set and a training set. In several implementations, 80% of the voice data is placed into the training set, and 20% of the voice data is placed into the test set. Various implementations will split the voice data by different percentages.

In select implementations, at least a portion of the training set and test set does not contain a voice. For example, such data can be useful for training the machine-learning as a reference against which voice data containing a voice can be distinguished.

The algorithm 400 then advances to 440.

In 440, the algorithm 400 trains a machine-learning algorithm at least in part based on the training set. The machine-learning algorithm can be implemented with supervised learning, semi-supervised learning, or reinforcement learning. Examples of supervised learning include decision trees, support vector machines, random forests, and naïve Bayes. The algorithm 400 then advances to 450.

In 450, the algorithm 400 evaluates the machine-learning algorithm at least in part based on the test set of voice data. If the algorithm 400 determines the machine-learning algorithm is not successful (e.g., does not produce appropriate outputs from the test set), then the algorithm 400 returns to 430. In this case, the algorithm 400 can re-split the voice data in 430, such that different voice data is placed in the training set and the test set. Further, the machine-learning algorithm can be updated or otherwise retrained in 440, rather than constructed anew from the different training set.

Briefly returning to 450, if the algorithm 400 determines the machine-learning algorithm is successful (e.g., produces an appropriate output from the test set), then the algorithm 400 advances to 470.

Further, briefly returning to 410, the algorithm 400 also receives a telephone call in 460. The algorithm 400 then advances to 470.

In 470, the algorithm 400 applies, to the telephone call received in 460, the machine-learning algorithm successfully evaluated in 450. The algorithm then advances to 480.

In 480, the algorithm 400 produces an output from the machine-learning algorithm applied to the telephone call in 460. The output can identify whether a call is legitimate, for example. The output can identify a location, type of emergency, or telephone number, according to the emergency detail response. The algorithm 400 then advances to 490 and concludes.

Figure 5:
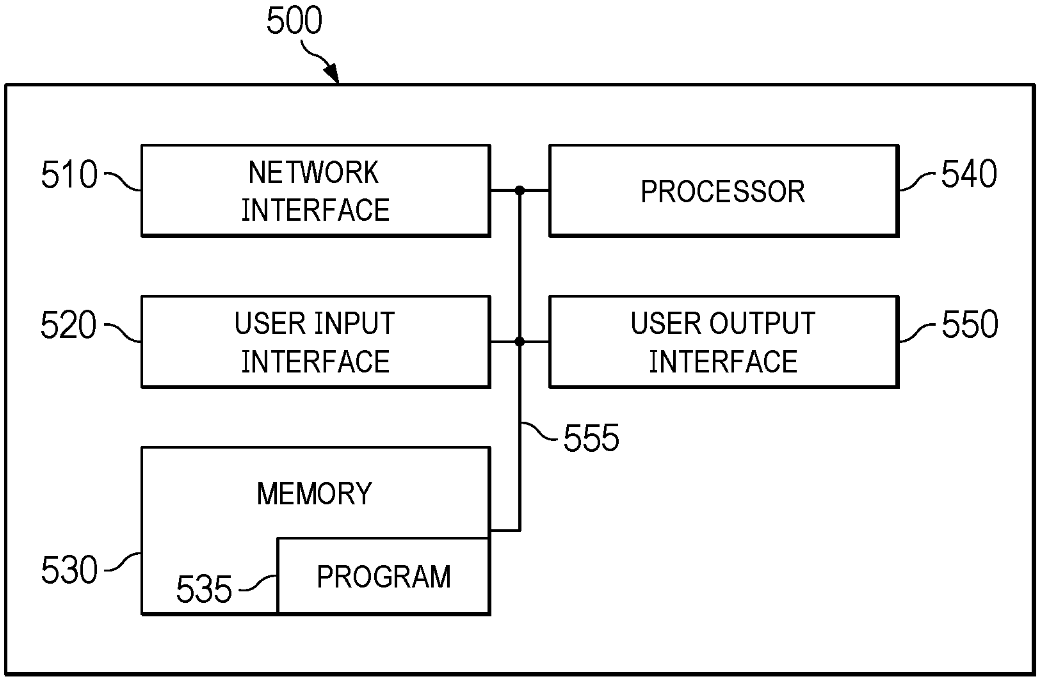
FIG. 5 illustrates a computing device, according to an implementation of the present disclosure.

FIG. 5 illustrates a computing device 500, according to an implementation of the present disclosure. The mobile telephone 110, the first agent 150, and the second agent 170 can be implemented by a computing device 500. Further, the cellular tower 130 and the PSAP 190 can include the computing device 500.

The computing device 500 can include a network interface 510, a user input interface 520, a memory 530, a program 535, a processor 540, a user output interface 550, and a bus 555.

Although illustrated within a single housing, the computing device 500 can be distributed across plural housings or sub-systems that cooperate in executing program instructions. In some implementations, the computing device 500 can include one or more blade server devices, standalone server devices, personal computers (including laptop computers and tablet computers), routers, hubs, switches, bridges, firewall devices, intrusion detection devices, mainframe computers, network-attached storage devices, smartphones and other mobile telephones, and other computing devices. Although the computing device executes the Windows OS, macOS, or Linux in many implementations, the hardware can be configured according to a Symmetric Multi-Processing (SMP) architecture or a Non-Uniform Memory Access (NUMA) architecture.

The network interface 510 provides one or more communication connections and/or one or more devices that allow for communication between the computing device 500 and other computing systems (not shown) over a communication network, collection of networks (not shown), or the air, to support the precision routing for an emergency call, outlined herein. The network interface 510 can communicate using various networks (including both internal and external networks) such as near-field communications (NFC), Wi-Fi™, Bluetooth, Ethernet, cellular (e.g., 3G, 4G, 5G), white space, 802.11x, satellite, Bluetooth, LTE, GSM/HSPA, CDMA/EVDO, DSRC, CAN, GPS, facsimile, or any other wired or wireless interface. Other interfaces can include physical ports (e.g., Ethernet, USB, HDMI, etc.), interfaces for wired and wireless internal subsystems, and the like. Similarly, nodes and user equipment (e.g., mobile devices) of the system can also include suitable interfaces for receiving, transmitting, and/or otherwise communicating data or information in a network environment.

The user input interface 520 can receive one or more inputs from a human. The user input interface 520 can be or include a mouse, a touchpad, a keyboard, a touchscreen, a trackball, a camera, a microphone, a joystick, a game controller, a scanner, and/or any other input device.

The memory 530, also termed a "storage," can include or be one or more computer-readable storage media readable by the processor 540 and that store software. The memory 530 can be implemented as one storage device or across multiple co-located or distributed storage devices or sub-systems. The memory 530 can include additional elements, such as a controller, that communicate with the processor 540. The memory 530 can also include storage devices and/or sub-systems on which data and/or instructions are stored. The computing device 500 can access one or more storage resources to access information to carry out any of the processes indicated in this disclosure and, in particular, FIGS. 2-4. In various implementations, the memory 530 stores the program 535 to execute at least a portion of the algorithms illustrated in FIGS. 2-4. Further, the program 535, when executed by the computing device 500 generally and/or the processor 540 specifically, can direct, among other functions, performance of the operations of precision routing for an emergency call, as described herein.

The memory 530 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a field programmable gate array (FPGA), a hard drive, a cache memory, a flash memory, a removable disk, or a tape reel. The memory 530 can be or include resistive RAM (RRAM) or a magneto-resistive RAM (MRAM). The information being tracked, sent, received, or stored in the communication system can be provided in any database, register, table, cache, queue, control list, or storage structure, based on particular implementations, all of which could be referenced in any suitable timeframe.

The processor 540 (e.g., a processing unit) can be or include one or more hardware processors and/or other circuitry that retrieve and execute software, especially the program 535, from the memory 530. The processor 540 can be implemented within one processing device, chip, or package and can also be distributed across multiple processing devices, chips, packages, or sub-systems that cooperate.

In some implementations, the processor 540 is or includes a Graphics Processing Unit (GPU) or neural processing unit (NPU).

The processor 540 can have any register size, such as a 32-bit register or a 64-bit register, among others. The processor 540 can include multiple cores. Implementations of the processor 540 are not limited to any particular number of threads. The processor 540 can be fabricated by any process technology, such as 14 nm process technology.

The user output interface 550 outputs information to a human user. The user output interface 550 can be or include a display (e.g., a screen), a touchscreen, speakers, a printer, or a haptic feedback unit. In many implementations, the user output interface 550 can be combined with the user input interface 520. For example, some such implementations include a touchscreen, a headset including headphones and a microphone, or a joystick with haptic feedback.

In implementations including multiple computing devices, a server of the system or, in a serverless implementation, a peer can use one or more communications networks that facilitate communication among the computing devices to achieve the precision routing for an emergency call, as outlined herein. For example, the one or more communications networks can include or be a local area network (LAN) or wide area network (WAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, an ASIC, and cache memory, and to transitory storage media, such as carrier waves or propagating signals.

Aspects of the system can be implemented in various manners, e.g., as a method, a system, a computer program product, or one or more computer-readable storage media. Accordingly, aspects of the present disclosure can take the form of a hardware implementation, a software implementation (including firmware, resident software, or micro-code) or an implementation combining software and hardware aspects that can generally be referred to herein as a "module" or a "system." Functions described in this disclosure can be implemented as an algorithm executed by one or more hardware processing units, e.g., the processor 540. In various embodiments, different operations and portions of the operations of the algorithms described can be performed by different processing units. In some implementations, the operations can be achieved by reciprocating software in any of the mobile telephone 110, the cellular tower 130, the first agent 150, the second agent 170, and the PSAP 190. The program 535 can be implemented using reciprocating software. Furthermore, aspects of the present disclosure can take the form of a computer program product embodied in one or more computer-readable media having computer-readable program code embodied, e.g., encoded or stored, thereon. In various implementations, such a computer program can, for example, be downloaded (or updated) to existing devices and systems or be stored upon manufacture of these devices and systems.

Any suitable permutation can be applied to a physical implementation, including the design of the communications network in which the system is implemented. In one embodiment, the bus 555 can share hardware resources with the memory 530 and the processor 540. In this alternative implementation, the computing device 500 can be provided with separate hardware resources including one or more processors and memory elements.

In example implementations, various other components of the computing device 500 can be installed in different physical areas or can be installed as single units.

The communication system can be configured to facilitate communication with machine devices (e.g., vehicle sensors, instruments, electronic control units (ECUs), embedded devices, actuators, displays, etc.) through the bus 555. Other suitable communication interfaces can also be provided for an Internet Protocol (IP) network, a user datagram protocol (UDP) network, or any other suitable protocol or communication architecture enabling network communication with machine devices.

The innovations in this detailed description can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable, non-transitory memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. A non-transitory, computer-readable storage medium can include instructions to allow one or more processors to carry out the emulation.

In another example implementation, the electrical circuits of the drawings can be implemented as stand-alone modules (e.g., a device with associated components and circuitry configured to perform a specific application or function) or implemented as plug-in modules into application specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions on one chip substrate. Other implementations can include a multi-chip-module (MCM), with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors and logic operations) have been offered for non-limiting purposes of example and teaching. For example, various modifications and changes can be made to the arrangements of components. The description and drawings are, accordingly, to be regarded in an illustrative sense, not in a restrictive sense.

The numerous examples provided herein described interaction in terms of two, three, or more electrical components for purposes of clarity and example. The system can be consolidated in any manner. Along similar design alternatives, the illustrated components, modules, and elements of the drawings can be combined in various possible configurations within the scope of this disclosure. In certain cases, one or more of the functionalities of a given set of flows might be more clearly described by referencing a limited number of electrical elements. The electrical circuits of the drawings are readily scalable and can accommodate many components, as well as more complicated/sophisticated arrangements and configurations. Accordingly, the provided examples do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation," "example implementation," "an implementation," "another implementation," "some implementations," "various implementations," "other implementations," "alternative implementation," and the like are intended to mean that any such features can be included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

Examples

In Example AM1, a method is implemented by a system, the method including receiving a call; determining whether an automatic number identification (ANI) of the call is valid; and routing the call to an agent.

Example AM2 is the method of Example AM1, wherein the routing is performed if the ANI of the call is not valid.

Example AM3 is the method of any of Examples AM1-AM2, further comprising: transmitting an emergency confirmation request; and releasing the call, if it is determined that an emergency confirmation response to the emergency confirmation request was not received.

Example AM4 is the method of any of Examples AM1-AM3, further comprising: routing the call to a public safety answering point (PSAP), if it is determined that the ANI of the call is valid.

Example AM5 is the method of any of Examples AM1-AM4, further comprising: adding an identifier of a cellular tower to the call.

Example AM6 is the method of any of Examples AM1-AM5, further comprising: adding an identifier of a public safety answering point (PSAP) to the call.

Example AM7 is the method of Example AM6, wherein the identifier of the PSAP is determined at least in part based on a side of a cellular tower that received the call.

In Example AS1, a system includes at least one network interface; and at least one processor configured, with the at least one network interface, to cause the system to at least receive a call; determine whether an automatic number identification (ANI) of the call is valid; and perform a routing of the call to an agent.

Example AS2 is the system of Example AS1, wherein the routing is performed if the ANI of the call is not valid.

Example AS3 is the system of any of Examples AS1-AS2, wherein the at least one processor is further configured, with the at least one network interface, to cause the system to at least transmit an emergency confirmation request; and release the call, if it is determined that an emergency confirmation response to the emergency confirmation request was not received.

Example AS4 is the system of any of Examples AS1-AS3, wherein the at least one processor is further configured, with the at least one network interface, to cause the system to at least route the call to a public safety answering point (PSAP), if it is determined that the ANI of the call is valid.

Example AS5 is the system of any of Examples AS1-AS4, wherein the at least one processor is further configured, with the at least one network interface, to cause the system to at least add an identifier of a cellular tower to the call.

Example AS6 is the system of any of Examples AS1-AS5, wherein the at least one processor is further configured, with the at least one network interface, to cause the system to at least add an identifier of a public safety answering point (PSAP) to the call.

Example AS7 is the system of Example AS6, wherein the identifier of the PSAP is determined at least in part based on a side of a cellular tower that received the call.

In Example AC1, a computer-readable medium is encoded with a computer program that, when executed by a system including at least one processor, causes the system to perform operations comprising: receiving a call; determining whether an automatic number identification (ANI) of the call is valid; and routing the call to an agent.

Example AC2 is the medium of Example AC1, wherein the routing is performed if the ANI of the call is not valid.

Example AC3 is the medium of any of Examples AC1-AC2, the operations further comprising: transmitting an emergency confirmation request; and releasing the call, if it is determined that an emergency confirmation response to the emergency confirmation request was not received.

Example AC4 is the medium of any of Examples AC1-AC3, the operations further comprising: routing the call to a public safety answering point (PSAP), if it is determined that the ANI of the call is valid.

Example AC5 is the medium of any of Examples AC1-AC4, the operations further comprising: adding an identifier of a cellular tower to the call.

Example AC6 is the medium of any of Examples AC1-AC5, the operations further comprising: adding an identifier of a public safety answering point (PSAP) to the call.

Example AC7 is the medium of Example AC6, wherein the identifier of the PSAP is determined at least in part based on a side of a cellular tower that received the call.

In Example AF1, a system includes means for receiving a call; and means for determining whether an automatic number identification (ANI) of the call is valid, wherein the call is routed to an agent.

Example AF2 is the system of Example AF1, wherein the call is routed to the agent, if the ANI of the call is not valid.

Example AF3 is the system of any of Examples AF1-AF2, further comprising: means for transmitting an emergency confirmation request; and means for releasing the call, if it is determined that an emergency confirmation response to the emergency confirmation request was not received.

Example AF4 is the system of any of Examples AF1-AF3, further comprising: means for routing the call to a public safety answering point (PSAP), if it is determined that the ANI of the call is valid.

Example AF5 is the system of any of Examples AF1-AF4, further comprising: means for adding an identifier of a cellular tower to the call.

Example AF6 is the system of any of Examples AF1-AF5, further comprising: means for adding an identifier of a public safety answering point (PSAP) to the call.

Example AF7 is the system of Example AF6, wherein the identifier of the PSAP is determined at least in part based on a side of a cellular tower that received the call.

In Example BM1, a method is implemented by a system, the method comprising: receiving a call; determining whether the call is legitimate; and routing the call to a public safety answering point (PSAP).

Example BM2 is the method of Example BM1, further comprising: transmitting an emergency detail request, wherein the determining is at least in part based on whether an emergency detail response to the emergency detail request is received.

Example BM3 is the method of any of Examples BM1-BM2, wherein the call includes call detail information indicating a location of a cellular tower, and the routing is performed, at least in part based on the location of the cellular tower.

Example BM4 is the method of Example BM3, wherein the emergency detail response indicates a location of an emergency, and the routing is performed, at least in part based on the location of the emergency.

Example BM5 is the method of Example BM3, wherein the emergency detail response indicates a type of emergency, and the routing is performed, at least in part based on the type of emergency.

Example BM6 is the method of any of Examples BM1-BM5, further comprising: releasing the call, if the determining determines that the call is not legitimate.

Example BM7 is the method of any of Examples BM1-BM6, further comprising: recording in a computer-aided dispatch log a disposition of the call, at least in part based on the determining.

In Example BS1, a system includes at least one network interface;

and at least one processor configured, with the at least one network interface, to cause the system to at least receive a call; perform a determination whether the call is legitimate; and perform a routing of the call to a public safety answering point (PSAP).

Example BS2 is the system of Example BS1, wherein the at least one processor is further configured, with the at least one network interface, to cause the system to at least transmit an emergency detail request, and the determination is at least in part based on whether an emergency detail response to the emergency detail request is received.

Example BS3 is the system of any of Examples BS1-BS2, wherein the call includes call detail information indicating a location of a cellular tower, and the routing is performed, at least in part based on the location of the cellular tower.

Example BS4 is the system of Example BS3, wherein the emergency detail response indicates a location of an emergency, and the routing is performed, at least in part based on the location of the emergency.

Example BS5 is the system of Example BS3, wherein the emergency detail response indicates a type of emergency, and the routing is performed, at least in part based on the type of emergency.

Example BS6 is the system of any of Examples BS1-BS5, wherein the at least one processor is further configured, with the at least one network interface, to cause the system to at least release the call, if the determination determines that the call is not legitimate.

Example BS7 is the system of any of Examples BS1-BS6, wherein the at least one processor is further configured, with the at least one network interface, to cause the system to at least record in a computer-aided dispatch log a disposition of the call, at least in part based on the determination.

In Example BC1, a computer-readable medium is encoded with a computer program that, when executed by a system including at least one processor, causes the system to perform operations comprising: receiving a call; determining whether the call is legitimate; and routing the call to a public safety answering point (PSAP).

Example BC2 is the medium of Example BC1, the operations further comprising: transmitting an emergency detail request, wherein the determining is at least in part based on whether an emergency detail response to the emergency detail request is received.

Example BC3 is the medium of any of Examples BC1-BC2, wherein the call includes call detail information indicating a location of a cellular tower, and the routing is performed, at least in part based on the location of the cellular tower.

Example BC4 is the medium of Example BC3, wherein the emergency detail response indicates a location of an emergency, and the routing is performed, at least in part based on the location of the emergency.

Example BC5 is the medium of Example BC3, wherein the emergency detail response indicates a type of emergency, and the routing is performed, at least in part based on the type of emergency.

Example BC6 is the medium of any of Examples BC1-BC5, the operations further comprising: releasing the call, if the determining determines that the call is not legitimate.

Example BC7 is the medium of any of Examples BC1-BC6, the operations further comprising: recording in a computer-aided dispatch log a disposition of the call, at least in part based on the determining.

In Example BF1, a system includes means for receiving a call; and means for performing a determination whether the call is legitimate, wherein the call is routed to a public safety answering point (PSAP).

Example BF2 is the system of Example BF1, further comprising: means for transmitting an emergency detail request, wherein the determination is at least in part based on whether an emergency detail response to the emergency detail request is received.

Example BF3 is the system of any of Examples BF1-BF2, wherein the call includes call detail information indicating a location of a cellular tower, and the call is routed, at least in part based on the location of the cellular tower.

Example BF4 is the system of Example BF3, wherein the emergency detail response indicates a location of an emergency, and the call is routed, at least in part based on the location of the emergency.

Example BF5 is the system of Example BF3, wherein the emergency detail response indicates a type of emergency, and the call is routed, at least in part based on the type of emergency.

Example BF6 is the system of any of Examples BF1-BF5, further comprising: means for releasing the call, if the determining determines that the call is not legitimate.

Example BF7 is the system of any of Examples BF1-BF6, further comprising: means for recording in a computer-aided dispatch log a disposition of the call, at least in part based on the determination.

I claim:

1. A method implemented by a system, the method comprising:
- receiving a call at a first agent;
- determining whether an automatic number identification (ANI) of the call is valid, wherein the ANI is not valid if the ANI is one of a plurality of predetermined numbers;
- routing the call to a second agent, if the ANI is not valid;
- transmitting an emergency detail request over the call;
- determining whether the call is legitimate, at least in part based on whether an emergency detail response to the emergency detail request is received over the call; and
- routing the call to a public safety answering point (PSAP), if the determining determines the call is legitimate.

2. The method of claim 1, wherein the call includes call detail information indicating a location of a cellular tower, and the routing is performed, at least in part based on the location of the cellular tower.

3. The method of claim 2, wherein the emergency detail response indicates a location of an emergency, and the routing is performed, at least in part based on the location of the emergency.

4. The method of claim 2, wherein the emergency detail response indicates a type of emergency, and the routing is performed, at least in part based on the type of emergency.

5. The method of claim 1, further comprising:
- releasing the call, if the determining determines that the call is not legitimate.

6. The method of claim 1, further comprising:
- recording in a computer-aided dispatch log a disposition of the call, at least in part based on the determining.

7. The method of claim 1, wherein the determining whether the call is legitimate is further based on a machine-learning algorithm.

8. A system, comprising:
- at least one network interface; and
- at least one processor configured, with the at least one network interface, to cause the system to at least receive a call at a first agent; determine whether an automatic number identification (ANI) of the call is valid, wherein the ANI is not valid if the ANI is one of a plurality of predetermined numbers; route the call to a second agent, if the ANI is not valid; transmit an emergency detail request over the call; perform a determination whether the call is legitimate, at least in part based on whether an emergency detail response to the emergency detail request is received over the call; and perform a routing of the call to a public safety answering point (PSAP), if the determination determines the call is legitimate.

9. The system of claim 8, wherein the call includes call detail information indicating a location of a cellular tower, and the routing is performed, at least in part based on the location of the cellular tower.

10. The system of claim 9, wherein the emergency detail response indicates a location of an emergency, and the routing is performed, at least in part based on the location of the emergency.

11. The system of claim 9, wherein the emergency detail response indicates a type of emergency, and the routing is performed, at least in part based on the type of emergency.

12. The system of claim 8, wherein the at least one processor is further configured, with the at least one network interface, to cause the system to at least release the call, if the determination determines that the call is not legitimate.

13. The system of claim 8, wherein the at least one processor is further configured, with the at least one network interface, to cause the system to at least record in a computer-aided dispatch log a disposition of the call, at least in part based on the determination.

14. The system of claim 8, wherein the determination whether the call is legitimate is further based on a machine-learning algorithm.

15. A non-transitory, computer-readable medium encoded with a computer program that, when executed by a system including at least one processor, causes the system to perform operations comprising:
- receiving a call at a first agent;
- determining whether an automatic number identification (ANI) of the call is valid, wherein the ANI is not valid if the ANI is one of a plurality of predetermined numbers;
- routing the call to a second agent, if the ANI is not valid;
- transmitting an emergency detail request over the call;
- determining whether the call is legitimate, at least in part based on whether an emergency detail response to the emergency detail request is received over the call; and
- routing the call to a public safety answering point (PSAP), if the determining determines the call is legitimate.

16. The medium of claim 15, wherein the call includes call detail information indicating a location of a cellular tower, and the routing is performed, at least in part based on the location of the cellular tower.

17. The medium of claim 16, wherein the emergency detail response indicates a location of an emergency, and the routing is performed, at least in part based on the location of the emergency.

18. The medium of claim 16, wherein the emergency detail response indicates a type of emergency, and the routing is performed, at least in part based on the type of emergency.

19. The medium of claim 15, the operations further comprising:
- releasing the call, if the determining determines that the call is not legitimate.

20. The medium of claim 15, wherein the determining whether the call is legitimate is further based on a machine-learning algorithm.

* * * * *